(12) United States Patent
Shushan et al.

(10) Patent No.: US 11,693,718 B2
(45) Date of Patent: Jul. 4, 2023

(54) WEBSITE PLUGIN TO ENHANCE AND STANDARDIZE CONTENT ACCESSIBILITY

(71) Applicant: W.P Plugin Ltd, Tel Aviv (IS)

(72) Inventors: Shlomo Shushan, Hadera (IS);
Menashe Shani, Tel Aviv (IS)

(73) Assignee: W.P Plugin Ltd, Tel Aviv (IS)

( * ) Notice: Subject to any disclaimer, the term of this patent is extended or adjusted under 35 U.S.C. 154(b) by 0 days.

(21) Appl. No.: 17/020,950

(22) Filed: Sep. 15, 2020

(65) Prior Publication Data

US 2022/0083406 A1    Mar. 17, 2022

(51) Int. Cl.
*G06F 9/54* (2006.01)
*G06F 9/445* (2018.01)
*G06F 16/9538* (2019.01)
*G06F 16/957* (2019.01)
*G06F 16/9532* (2019.01)

(52) U.S. Cl.
CPC .......... *G06F 9/547* (2013.01); *G06F 9/44526* (2013.01); *G06F 16/957* (2019.01); *G06F 16/9532* (2019.01); *G06F 16/9538* (2019.01)

(58) Field of Classification Search
CPC .. G06F 9/547; G06F 9/44526; G06F 16/9532; G06F 16/9538; G06F 16/957
See application file for complete search history.

(56) References Cited

U.S. PATENT DOCUMENTS

| | | | |
|---|---|---|---|
| 9,953,011 B1* | 4/2018 | Anderson | G06F 40/106 |
| 2014/0344665 A1* | 11/2014 | Fernandez Albaladejo | G06F 16/9577 715/234 |
| 2021/0203668 A1* | 7/2021 | Butler | G06F 21/577 |

* cited by examiner

*Primary Examiner* — Andrew C Georgandellis
(74) *Attorney, Agent, or Firm* — Tatonetti IP

(57) ABSTRACT

Implemented is a remote accessibility service that utilizes a plugin for websites to provide people with an enhanced and standardized browsing experience. The remote accessibility service transmits a plugin to a website that is instantiated on a host service, in which the plugin gathers content from the website and parses and stores the content at the remote accessibility service. The gathered content is transitioned into the remote accessibility service's closed system accessibility environment. Thus, content gathered from a series of e-commerce websites, for example, are all transitioned into a standardized format to enhance the accessibility experience for users. Transitioning the content into a single standardized format makes accessibility consistent, memorable, and harmonious for users who are perusing many websites—instead of relying on the proprietary, discordant, and often times clunky accessibility implementations among each website.

7 Claims, 18 Drawing Sheets

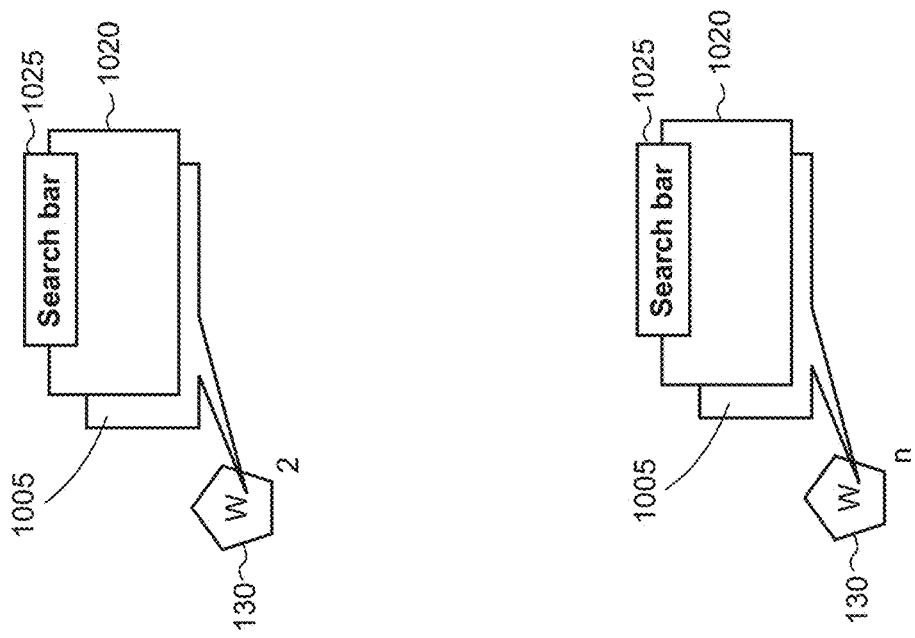
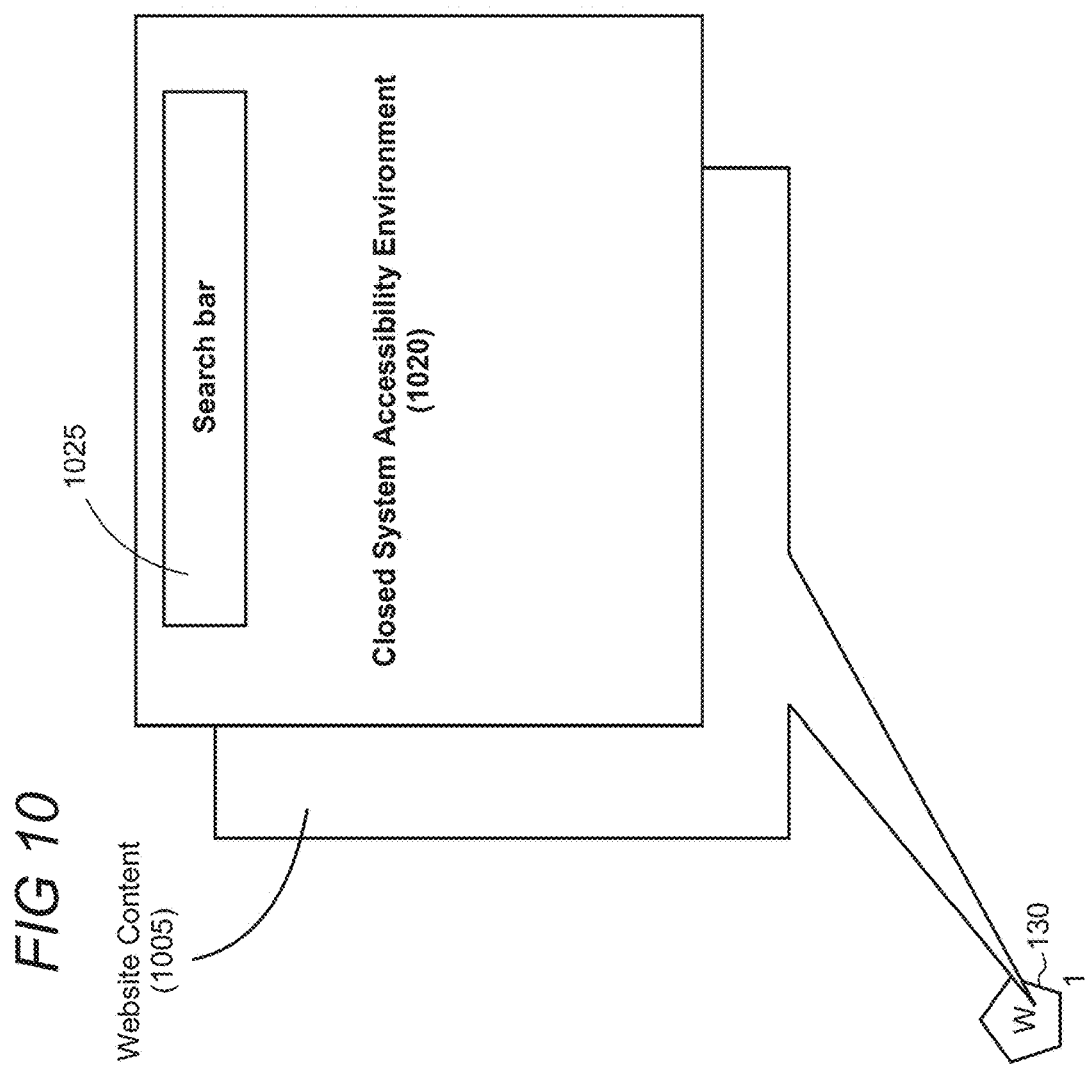

1800

WEBSITE PLUGIN TO ENHANCE AND STANDARDIZE CONTENT ACCESSIBILITY

BACKGROUND

Many countries and jurisdictions implement laws that require businesses to provide accessibility options to the handicapped and disabled; this is also true for the internet. For those with a disability, relying on a website's accessibility capabilities to browse, purchase goods on an e-commerce website, or otherwise peruse the internet, can be debilitating and frustrating. While many companies can easily configure their website to satisfy the minimum requirements of a respective jurisdictions' laws, the minimum requirements are hardly sufficient to make browsing the internet a pleasant experience for the disabled.

SUMMARY

Implemented is a remote accessibility service that utilizes a plugin for websites to provide people with an enhanced and standardized browsing experience. The remote accessibility service transmits a plugin to a website instantiated on a host service, in which the plugin gathers content from the website and parses and stores the content at the remote accessibility service. The gathered content is transitioned into the remote accessibility service's closed system accessibility environment. Thus, content gathered from a series of e-commerce websites, for example, are all transitioned into a standardized format to enhance the accessibility experience for users. Proprietary content and parameters for each website are transitioned using a set of standardized parameters at the remote accessibility service. Transitioning the content into a single standardized format makes accessibility consistent, memorable, and harmonious for users who are perusing many websites—instead of relying on the proprietary, discordant, and often times clunky accessibility implementations among each website.

Once a respective website grants access to and is stored on the remote accessibility service, users can trigger the accessibility option for the website, such as by clicking on a button or providing some other input into the website. The host service for the website may then re-direct the user to the accessibility version of the website at the remote accessibility service, at which point the user will engage with the closed system accessibility environment offered by the remote accessibility service. In this closed system environment, the websites flow is rearranged based on the customized (and standardized) design at the remote accessibility service regardless of the original design, parameters, and flow of a respective website. Thus, for example, two e-commerce websites with completely different products, organization, flow, categorizations, etc., are configured similarly in the closed system accessibility environment offered by the remote accessibility service.

Implementation of the remote accessibility service's closed system accessibility environment provides an enhanced, standardized, and harmonious user interface and user experience for people exhibiting a disability, such as the blind and deaf. Users can now learn a single closed system accessibility environment for navigating multiple websites instead of the disabled user having to learn each website's proprietary accessibility version. The standardized accessibility configuration not only provides a more coherent user experience and user interface, but it can also streamline a company's ability to offer an accessibility version of their website by utilizing the plugin and granting permission to the remote accessibility service. Instead of a website implementing some proprietary accessibility version of their website that satisfies some minimum standards of the law, the website can efficiently and effectively implement a legitimately viable solution for making their website accessible to disabled persons.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure. These and various other features will be apparent from a reading of the following Detailed Description and a review of the associated drawings.

DESCRIPTION OF THE DRAWINGS

FIG. 10 shows an illustrative representation in which the remote accessibility service provides a closed system accessibility environment for each web site;

Like reference numerals indicate like elements in the drawings. Elements are not drawn to scale unless otherwise indicated.

DETAILED DESCRIPTION

Figure 1:
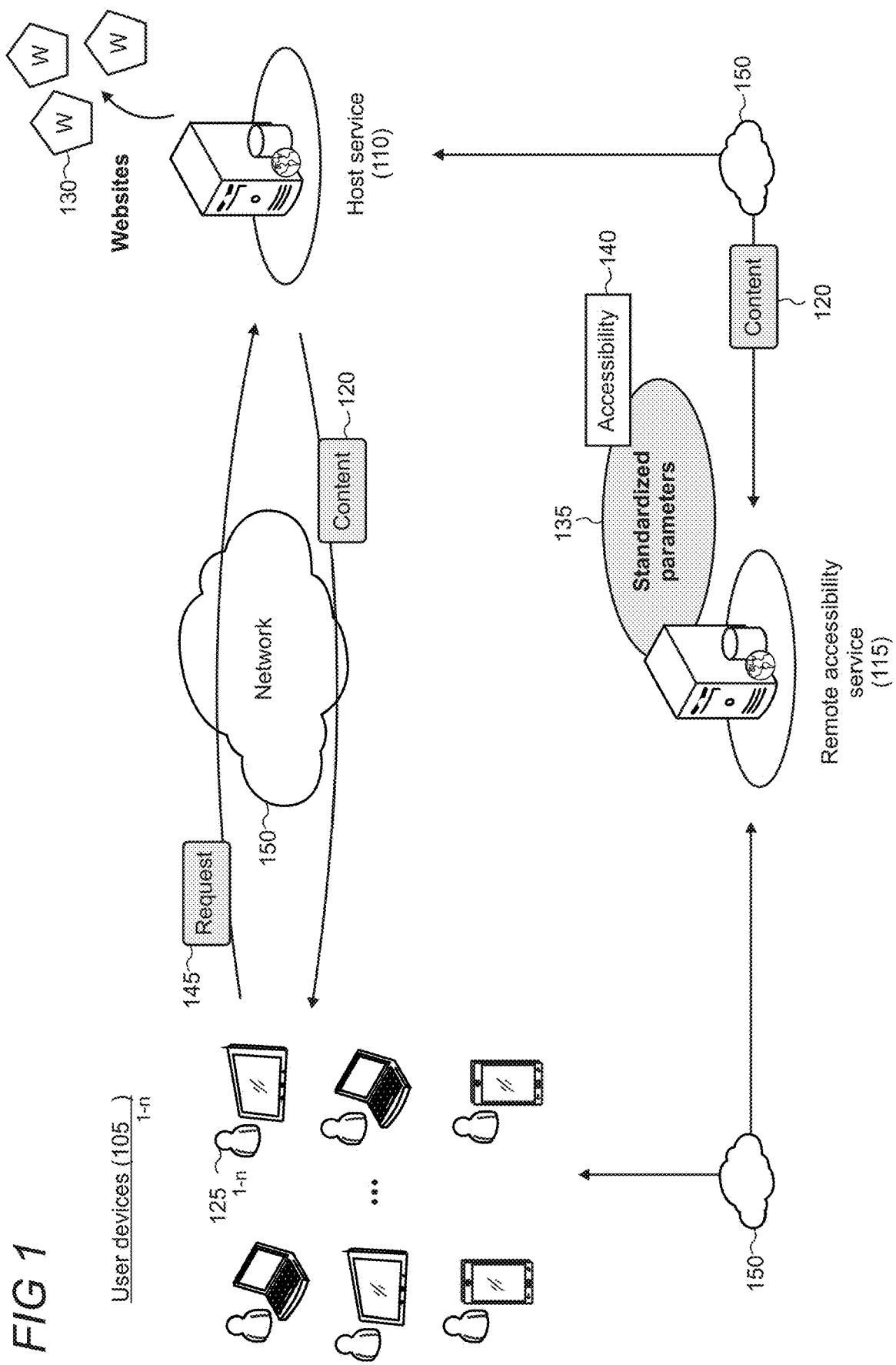
FIG. 1 shows an illustrative representation of a remote accessibility service interoperating with website on a host service.

FIG. 1 shows an illustrative representation in which users 125 operating respective user devices 105 may access and, using a web browser application, send a request 145 to browse websites 130 that are hosted on a remote host service 110. In typical implementations, the host service may transmit the content 120 for a requested website so that a user can browse the website, such as to purchase from an e-commerce website, read articles from a media site, gather information, etc. In some scenarios, the users 125 may have a disability, such as being blind or deaf, in which case the users may want to open an accessibility version of the website. Typically, accessibility versions of websites are configured to make browsing the web more convenient for those with a disability, such as by meeting the minimum standards in the Web Content Accessibility Guidelines (WCAG). These guidelines may require websites to provide text alternatives for non-text content, provide captions and other alternatives for multimedia, present content in various ways while maintaining the content's original meaning, and make it easier for users to see and hear content, among other guidelines.

A website's host service 110 may grant access to the website's content to a remote accessibility service 115 which is specifically configured and adapted to provide a convenient and harmonious accessibility environment for websites 130. The remote accessibility service may, for example, receive content 120 for a website and transition the content and parameters using a set of standardized parameters by which the content is delivered and exposed to a user 125 to enhance accessibility 140. Upon a user requesting the accessibility version of a website, the users may be redirected to the remote accessibility service's presentation. The details of the high-level process portrayed in FIG. 1 are discussed in greater detail below.

Figure 2:
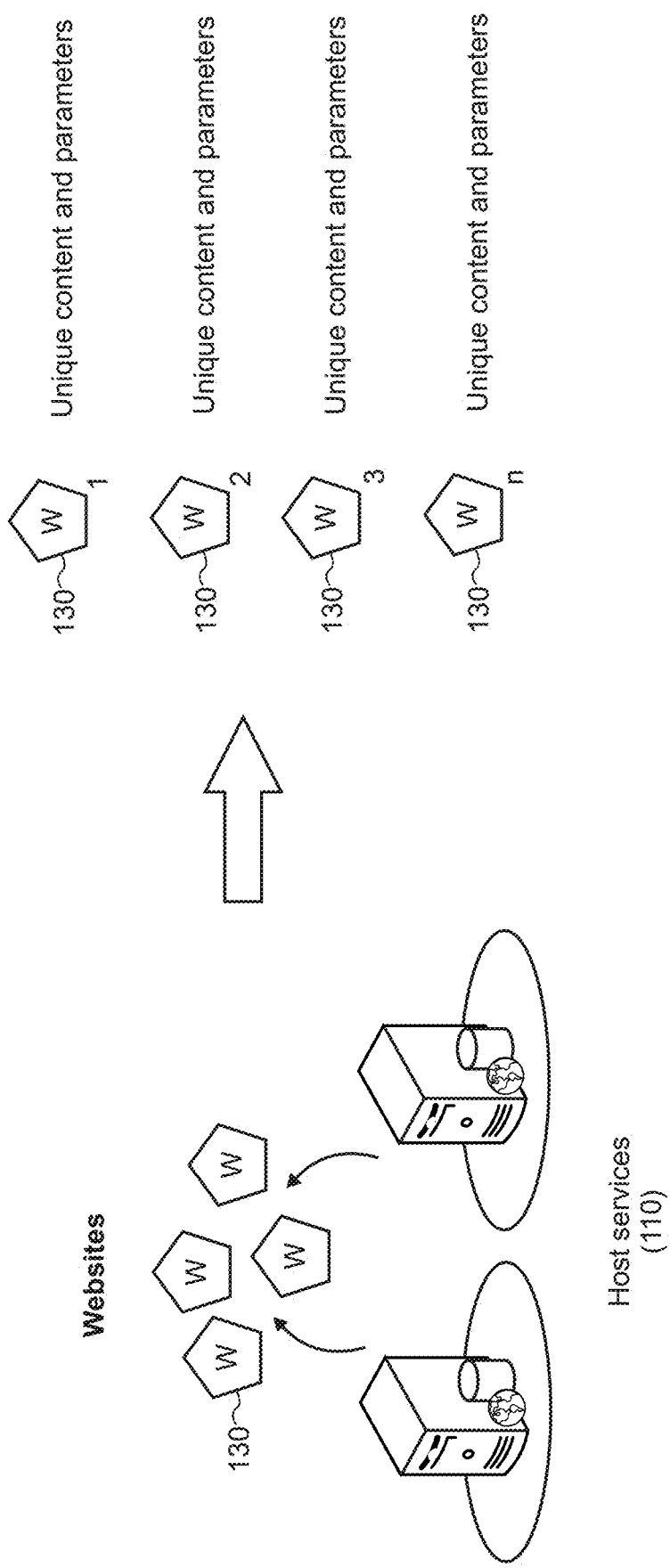
FIG. 2 shows an illustrative representation of the host service hosting websites with unique content and parameters.

FIG. 2 shows an illustrative representation in which host services, comprised of one or more servers and databases, can store multiple websites 130. Each website may be associated with unique content and parameters 205. For example, one e-commerce website may decide to present and categorize their content in a completely different way from another e-commerce website, even if both e-commerce websites are selling similar goods.

Figure 3:
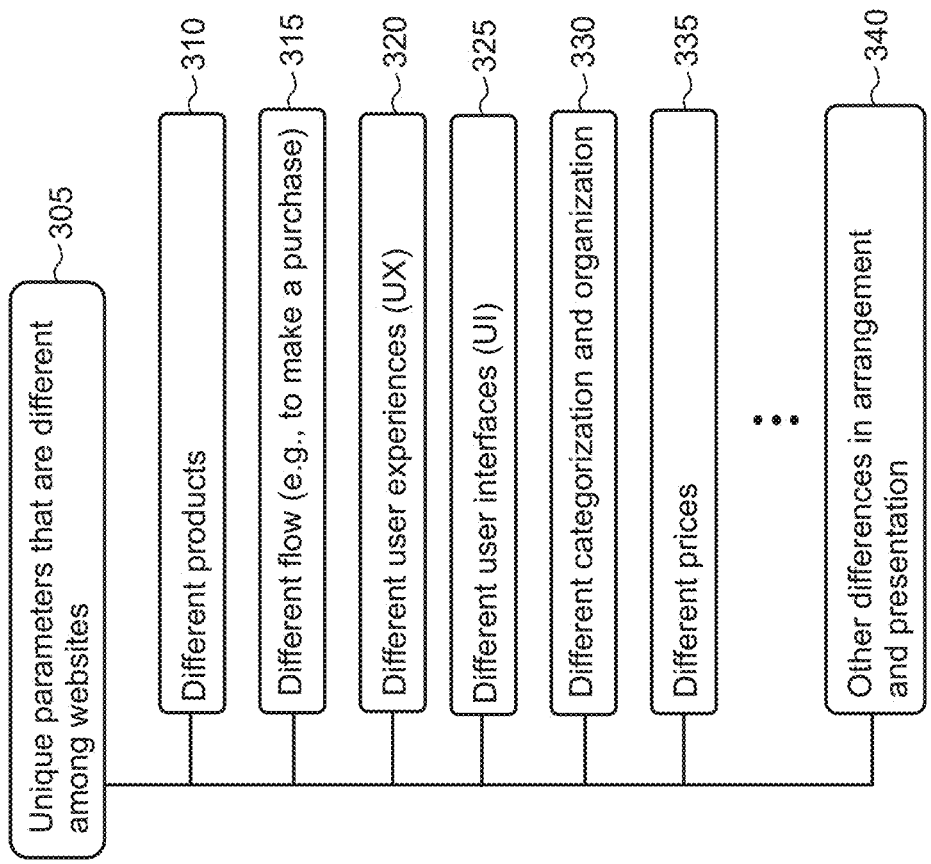
FIG. 3 shows an illustrative schema of unique parameters that are different among websites.

FIG. 3 shows an illustrative schema of unique parameters that are different among websites 305. Exemplary and non-exhaustive parameters include different products 310, different flow (e.g., flow to make a purchase) 315, different user experiences (UX) 320, different user interfaces (UI) 325, different categorization and organization 330, different prices 335, and other differences in arrangement and presentation 340.

Figure 4:
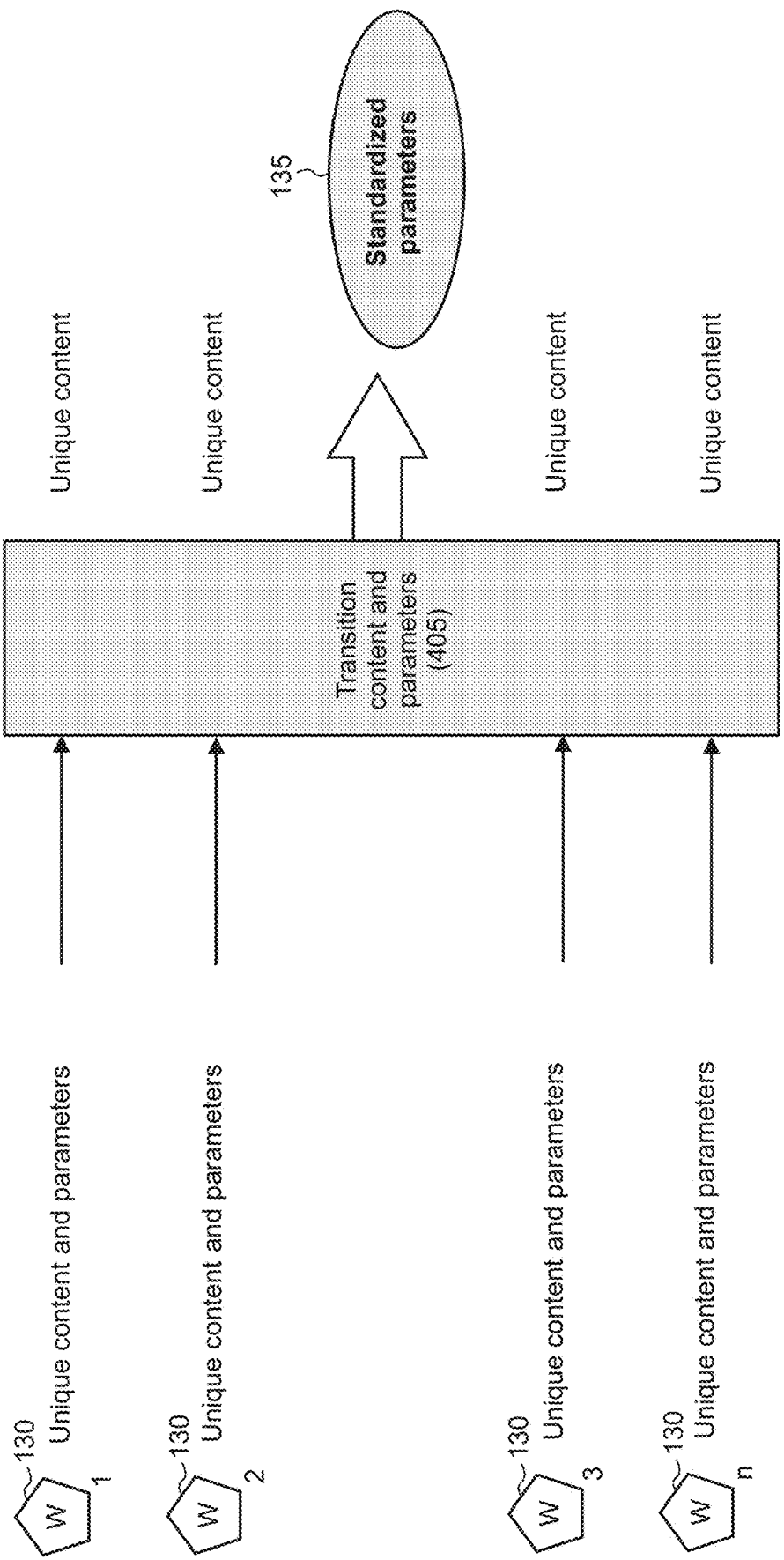
FIG. 4 shows an illustrative representation of the remote accessibility service transitioning the unique parameters for each website into a standardized format.

FIG. 4 shows an illustrative diagram in which the remote accessibility service 115 retrieves and transitions the unique content and parameters for the respective websites 130 into standardized parameters 135. The remote accessibility service is configured to take unique and proprietary website parameters and setup and transition them into a standardized format. The content is still unique for each website, but the content is now presented using the standardized format of the remote accessibility service to thereby create a harmonious browsing experience for end users that is reproducible across many websites.

Figure 5:
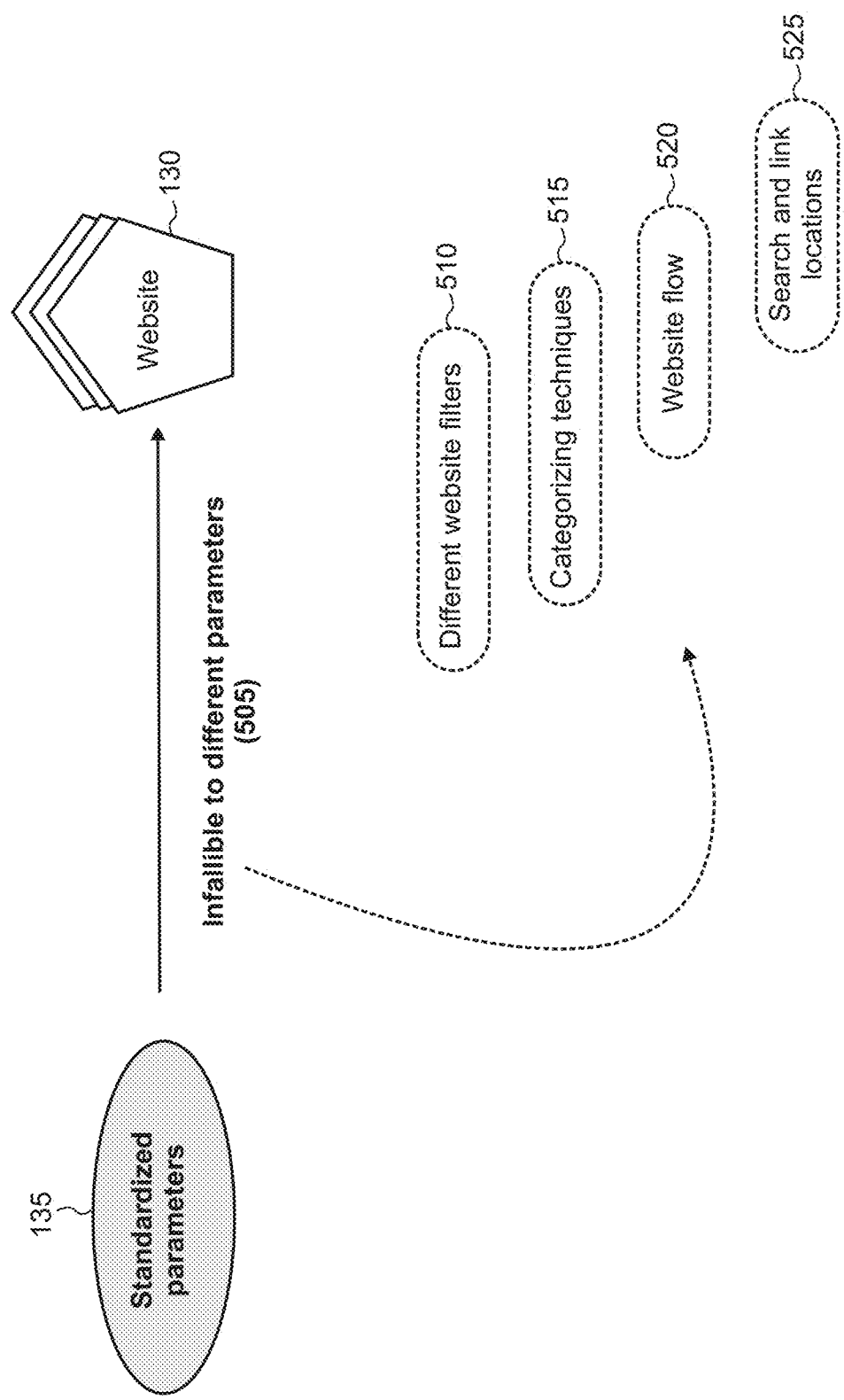
FIG. 5 shows an illustrative representation in which the standardized parameters for each website are infallible to different unique parameters for each web site.

FIG. 5 shows an illustrative environment in which the process and technique implemented by the remote accessibility service is infallible to different parameters utilized by each website, as representatively shown by numeral 505. For example, the various website's filters 510, categorizing techniques 515, website flow 520, and search and link locations are all parsable, transitionable, and configurable by the remote accessibility service (see FIG. 3 for additional differences).

Figure 6:
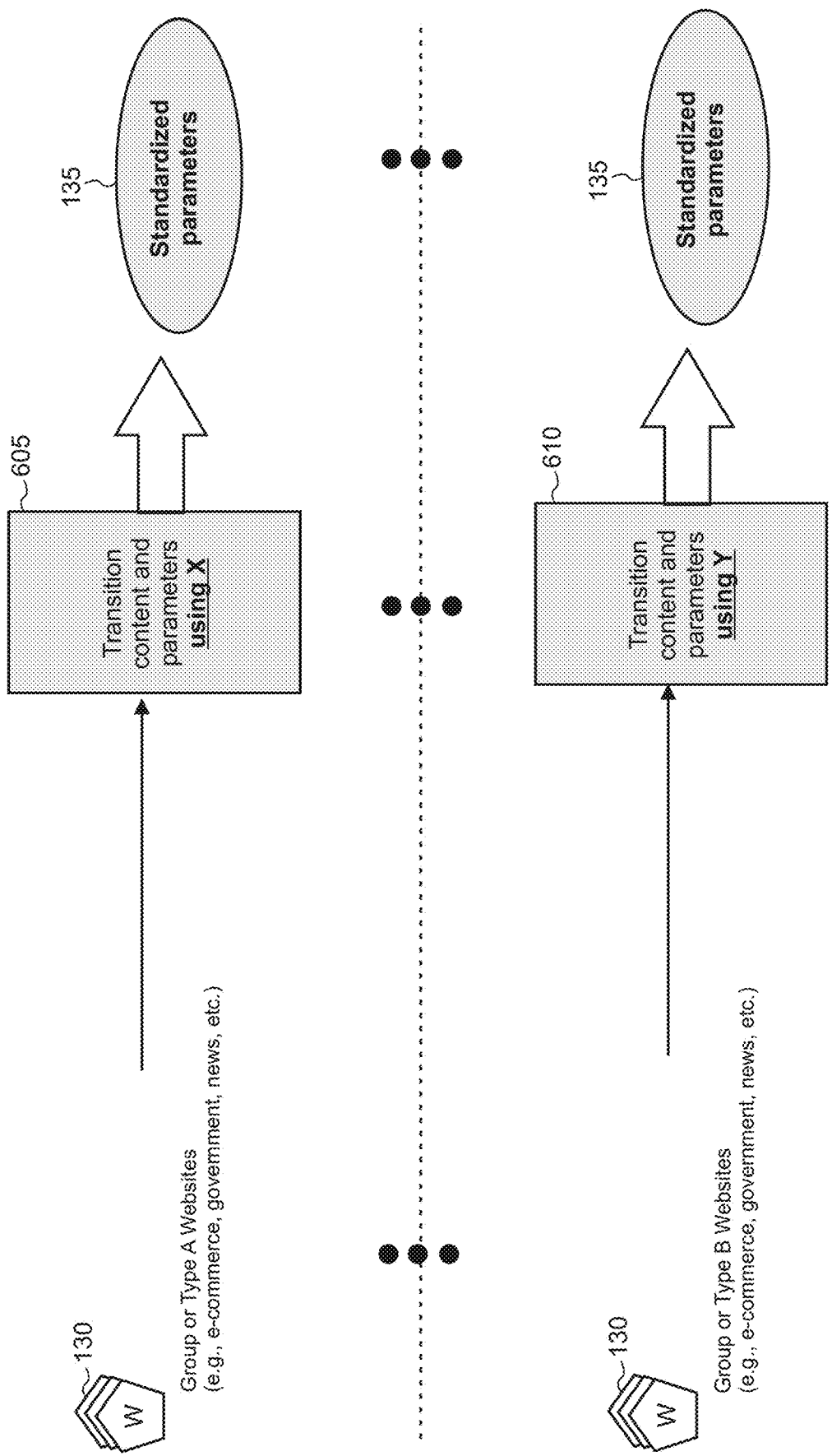
FIG. 6 shows an illustrative representation in which different types or groups of websites may be associated with a different set of standardized parameters.

FIG. 6 shows an illustrative diagram in which different groups or types of websites 130 may be transitioned differently from each other. For example, websites in Group or Type A may be transitioned differently than Group or Type B websites, and in which case different standardized parameters may be used. For example, Type A websites may be e-commerce websites that are presented differently than news websites in Type B. The different standardized parameters facilitate this difference in presentation. For example, e-commerce websites may be focused on presenting pictures and purchase options to users, whereas news websites may be focused on presenting written content. E-commerce websites may choose to present pictures adjacent to respective products, whereas the news websites may elect to place pictures of a story or scene at a consistent location in the article's presentation, such as at the end or beginning. This transition difference is illustrated in FIG. 6 by the use of X or Y methods, representatively shown by numeral 605 and 610.

The standardized parameters 135 for each type or group of websites are initialized and set by the administrator of the remote accessibility service 115. Upon a new website 130 implementing the plugin, a website owner may select which type or group of website their website belongs to so that the proper standardized parameters are used when generating the accessibility version of the website. Alternatively, the accessibility service's plugin may automatically detect or analyze the website's script code to determine which standardized parameters to apply.

Figure 7:
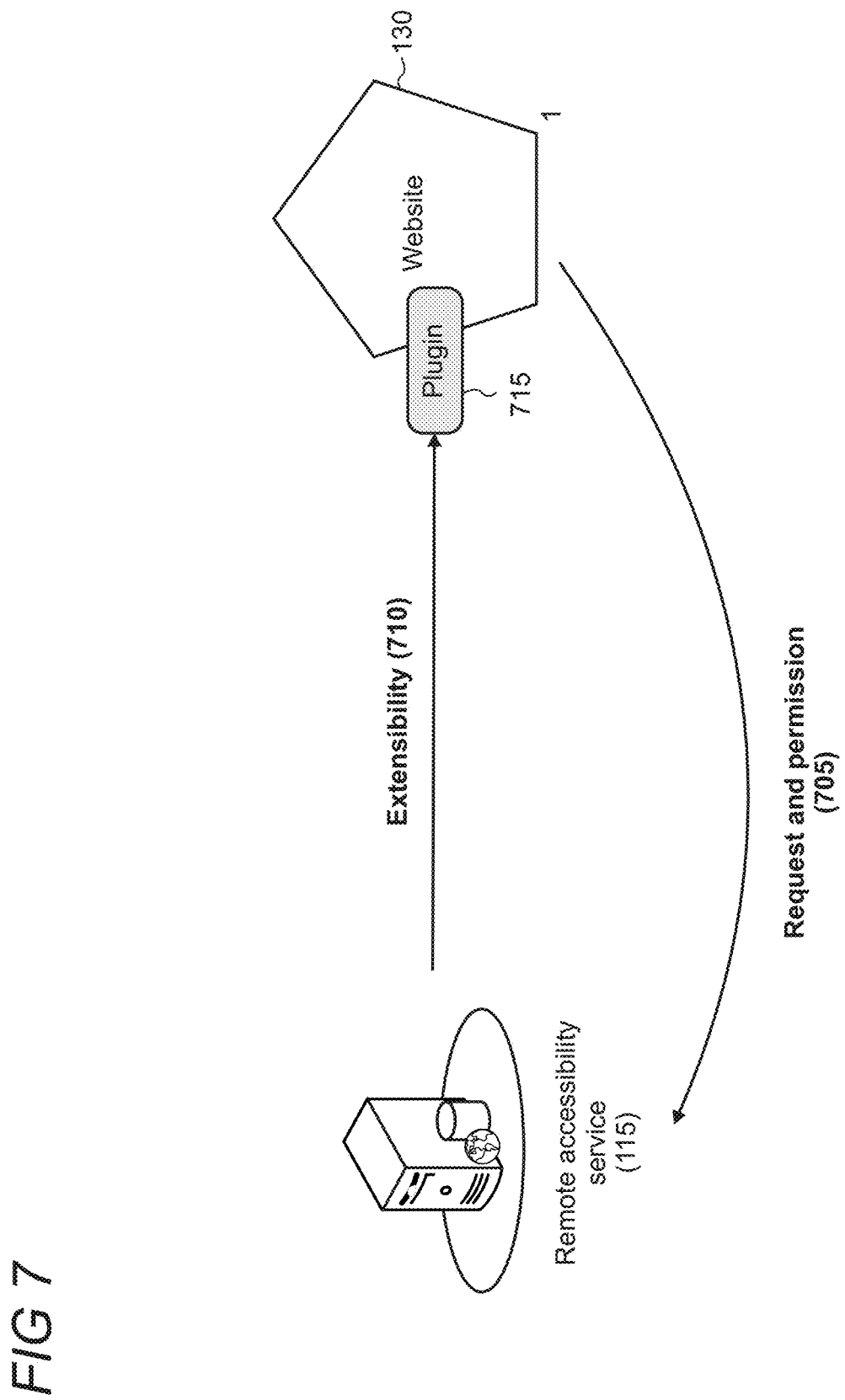
FIG. 7 shows an illustrative representation in which the remote accessibility service provides a plugin to a website upon receiving a request and permission.

FIG. 7 shows an illustrative representation in which a website 130, hosted on the host service 110 (not shown), transmits a request and grants permission to the remote accessibility service 705, as representatively shown by numeral 705. In response to the request and granted permission, the remote accessibility service may exhibit extensibility 710 and transmit a plugin 715 to the website 130 to facilitate the process of making the website accessible using the remote accessibility service's features. For example, the remote accessibility service may establish a connection with the website's host computer and transmit the plugin for instantiation and implementation.

Figure 8:
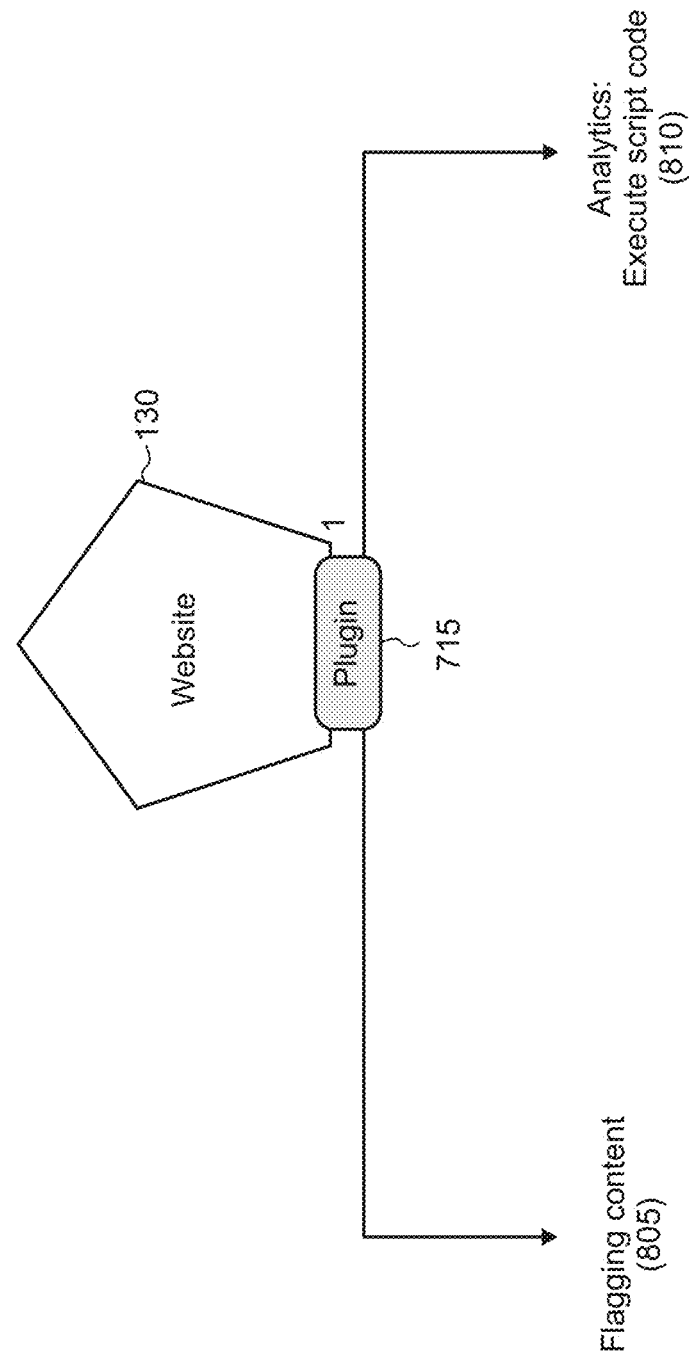
FIG. 8 shows an illustrative representation in which the plugin flags content or executes script code to gather content from a respective website.

FIG. 8 shows an illustrative representation in which the transmitted plugin 715 can perform various actions on a target website, including flagging content 805 or utilizing analytics to execute script code 810 to retrieve content for utilization by the remote accessibility service.

Flagging content indicates the process of branching the part of the HTML (hypertext markup language) code, in which certain code paths are switched on and off to activate plugin features and provide the required accessibility functions.

The manner in which content is retrieved directly depends on the specific plugin integration of the website which is preferred and selected by the website owner or administrator. Thus, the way in which the remote accessibility service's plugin 715 retrieves the page contents is dependent on the way in which the plugin is working, namely, was the plugin added to the website code as separate script or was it installed as a common plugin for the website's host platform, such as Wordpress®, Wix®, and the like. Thus, for example, the plugin may operate as an additional feature to a website creating or host platform, like Wix or Wordpress.

In cases in which the plugin is implemented to the site as an additional script, then utilizing analytics based on executing script code 810 will be responsible for HTML code changes on the website's front-end. JavaScrpt is utilized so the remote accessibility service 115 can interact with the website 130. For example, Google® Analytics and Facebook® Pixes are utilized for analytics purposes, in which these tools are configured to analyze the website's contents, identify, and pull the content. To find issues with accessibility, according to standards of WCAG, the remote accessibility service utilizes Google® axs tools library. The content is obtained using JavaScript through the webpage.

The plugin 715 may identify particular types of content that are relevant for processing, regardless of how the website categorized the content. For example, the plugin can identify the relevant information regardless of where it was placed and how it was presented by the website's owner, and transition that content into the standardized parameters set by the remote accessibility service 115. Thus, for example, the plugin can identify products, prices, categorizations, and the like, and then transition that flagged content using the standardized parameters and ultimately create a separate, distinct, and consistent layer.

Figure 9:
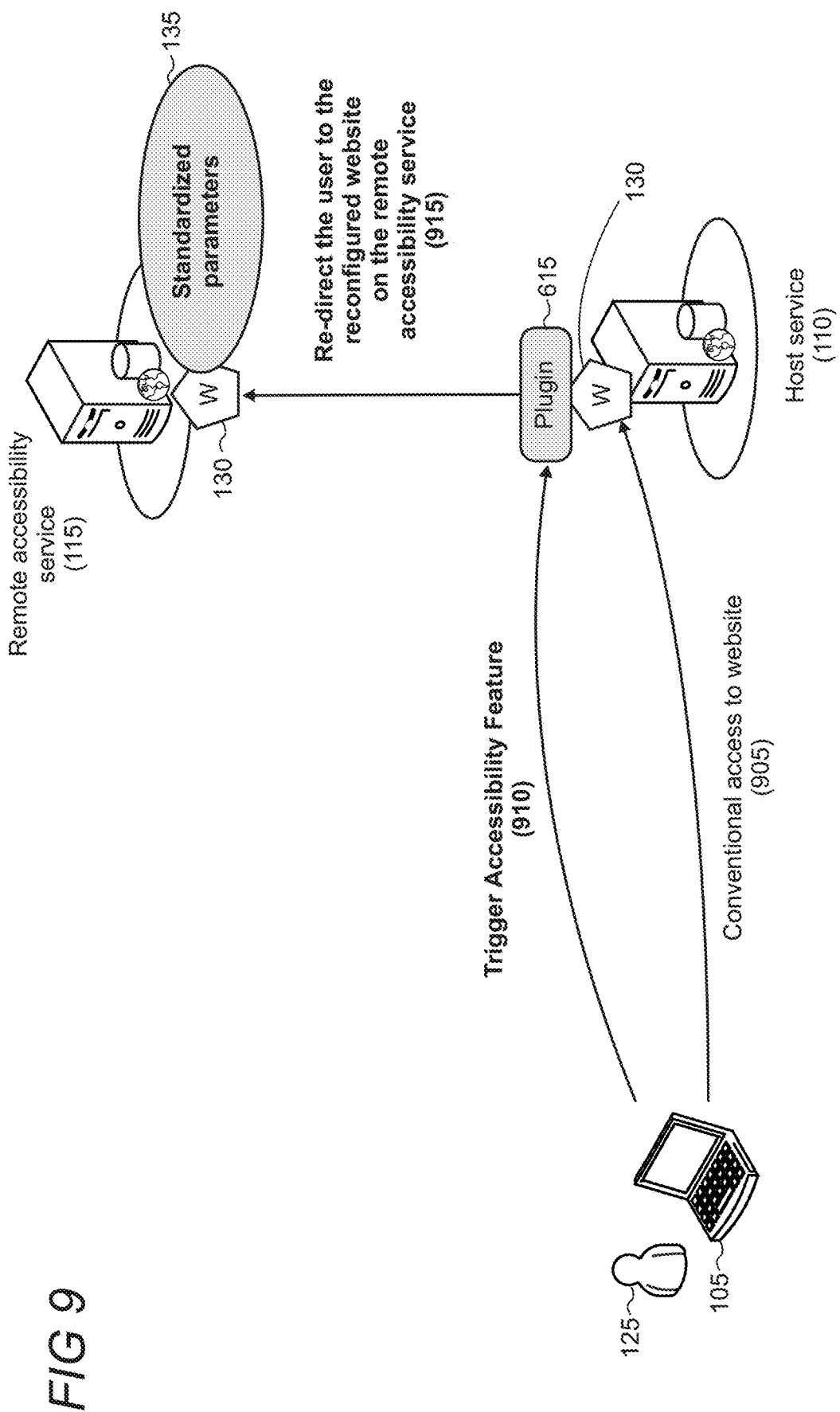
FIG. 9 shows an illustrative representation in which the host service re-directs a user to the remote accessibility service responsive to receiving a user's request to access the accessibility version of the website.

FIG. 9 shows an illustrative environment in which the user 125 accesses a website 130 hosted on host service 110. Conventionally, the user may access and be presented with the standard presentation of content in their computing device's web browser application, as representatively shown by numeral 905. The user may trigger the accessibility feature for the website, responsive to which an accessibility version may be presented on the user's computing device. The accessibility version may be triggered by the user clicking on a button or link presented on the website's user interface, or by being provided with some other input at the computing device, such as voice input, a hand gesture, etc. Upon triggering the accessibility feature, the host service may re-direct the user to the reconfigured website on the remote accessibility service 115, as representatively shown by numeral 915. The remote accessibility service stores an instantiation of the website 130 using the standardized parameters 135 which affects the website's presentation.

FIG. 10 shows an illustrative environment in which the remote accessibility service 115 provides a closed system accessibility environment 1020 of the website's content. As shown, the closed system environment overlays the conventional website's content 1005, such that the user is accessing, browsing, and leveraging the content layer provided by the remote accessibility service. In typical implementations, this layer may be inaccessible by the website or host service, such that the user is redirected to the accessibility version on the remote accessibility service. The user can utilize the search bar 1025 which enables searching of the closed system environment at the version stored on the remote accessibility service. The user can utilize the search bar and the closed system environment's setup based on the harmonious and consistent presentation provided by the standardized parameters, regardless of the website's conventional and proprietary setup.

Proprietary accessibility versions of websites may offer a search feature and a flow that enhances the accessibility for the user 125, but if each website 130 offers their own unique design features then users can still be confused and forced to learn that specific website's design and offerings. In contrast, the closed system accessibility environment 1020 for the website that is instantiated on the remote accessibility service 115 provides a consistent and harmonious accessibility experience for each website that utilizes the accessibility service's features. As shown in FIG. 10, each unique website 130 is able to consistently leverage the closed system accessibility environment 1020, search bar 1025, and other consistent setup of its user interface.

Figure 11:
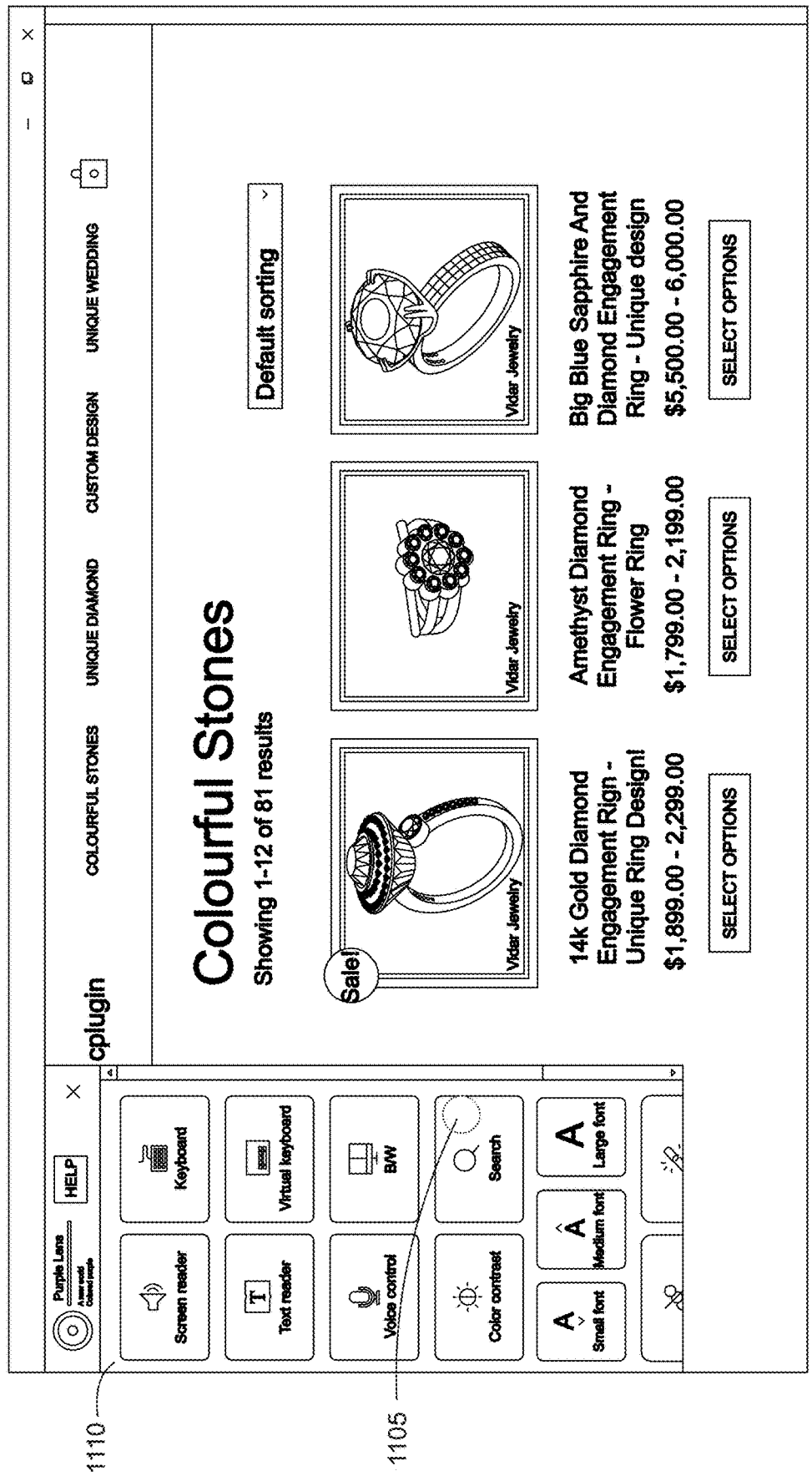
FIG. 11 shows an illustrative user interface in which a user executes the search option for the accessibility version of the website.

FIG. 11 shows an illustrative user interface of a website 130 within a web browser application on a user's computing device 105. The user may select 1105 the "Search" button among the list of accessibility options 1110 offered by the website.

Figure 12:
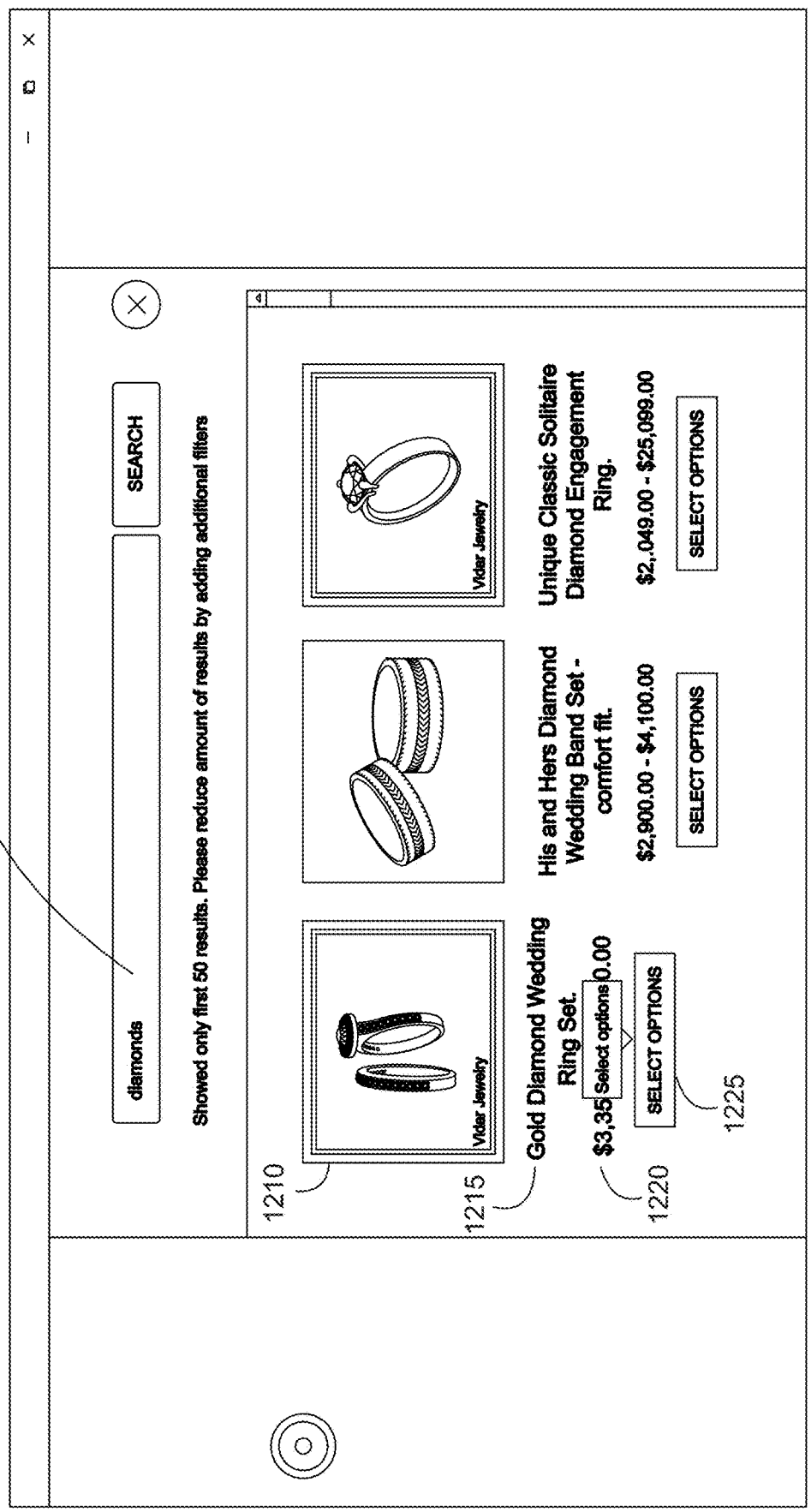
FIG. 12 shows an illustrative user interface in which a user enters a search inside the search box of the closed system accessibility environment.

FIG. 12 shows an illustrative user interface on which the user enters a search for the word "diamonds" in the search bar 1205 on the website. Shown in FIG. 12 is the closed system accessibility environment 1020 offered by the remote accessibility service 115. Thus, the user is currently accessing the instantiation of the website stored on the remote accessibility service's database, and which has been standardized using the service's standardized parameters. In this exemplary presentation, the pictures 1210, product description 1215, product pricing 1220, and select options 1225 button are presented based on the accessibility service's configuration, regardless of how the website's proprietary design is configured on the host service.

Figure 13:
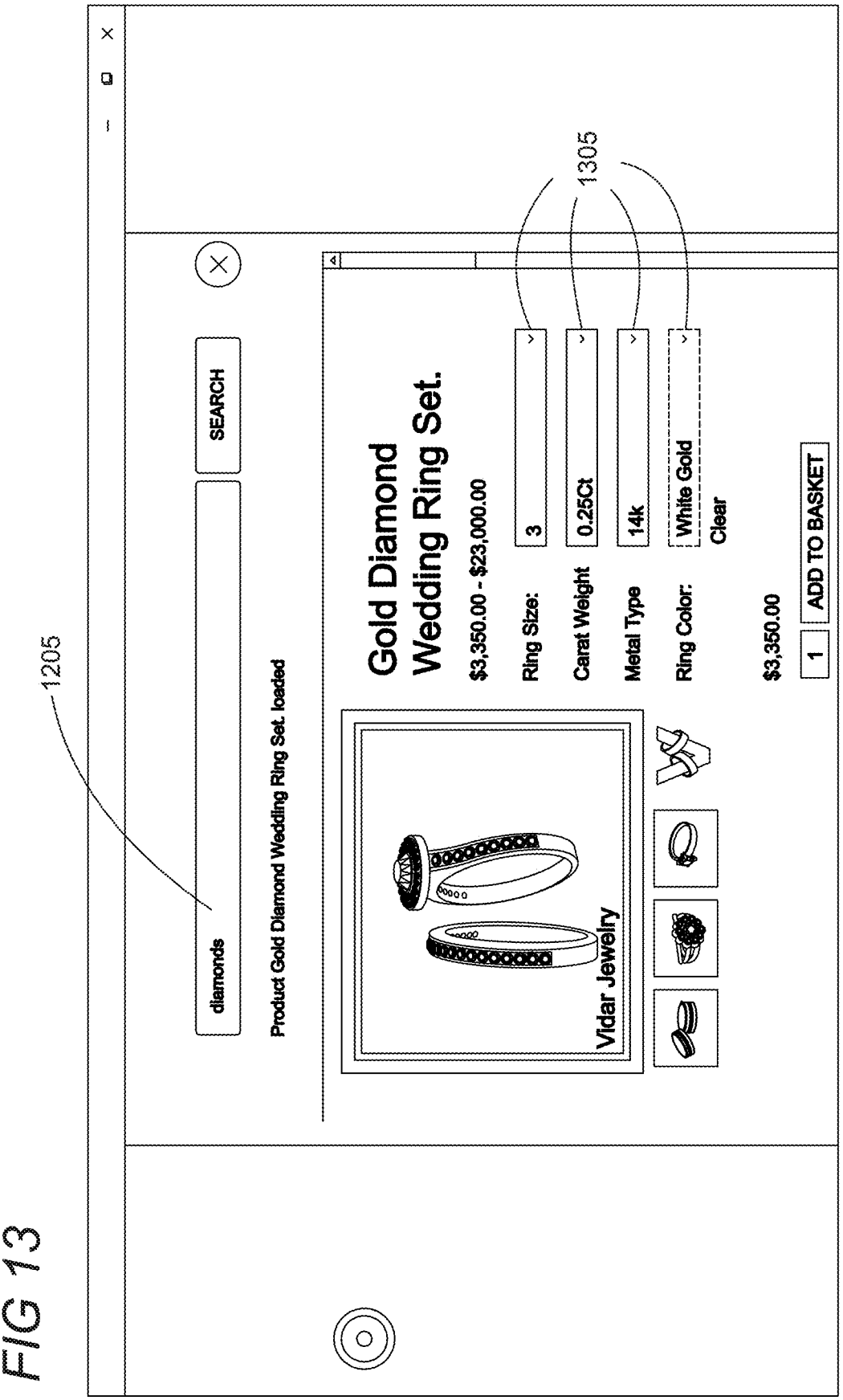
FIG. 13 shows an illustrative user interface of the websites flow inside the closed system accessibility environment.

FIG. 13 shows an illustrative user interface after the user 125 has selected one of the product options presented on the user interface shown in FIG. 12. In this closed system accessibility environment 1020, the remote accessibility service 115 uses its standardized parameters to present the product's details to the user, while also enabling the user to customize their purchase using options 1305. The website's proprietary setup may appear and present the information in a completely different manner than that which is presented in the closed system accessibility environment.

Figure 14:
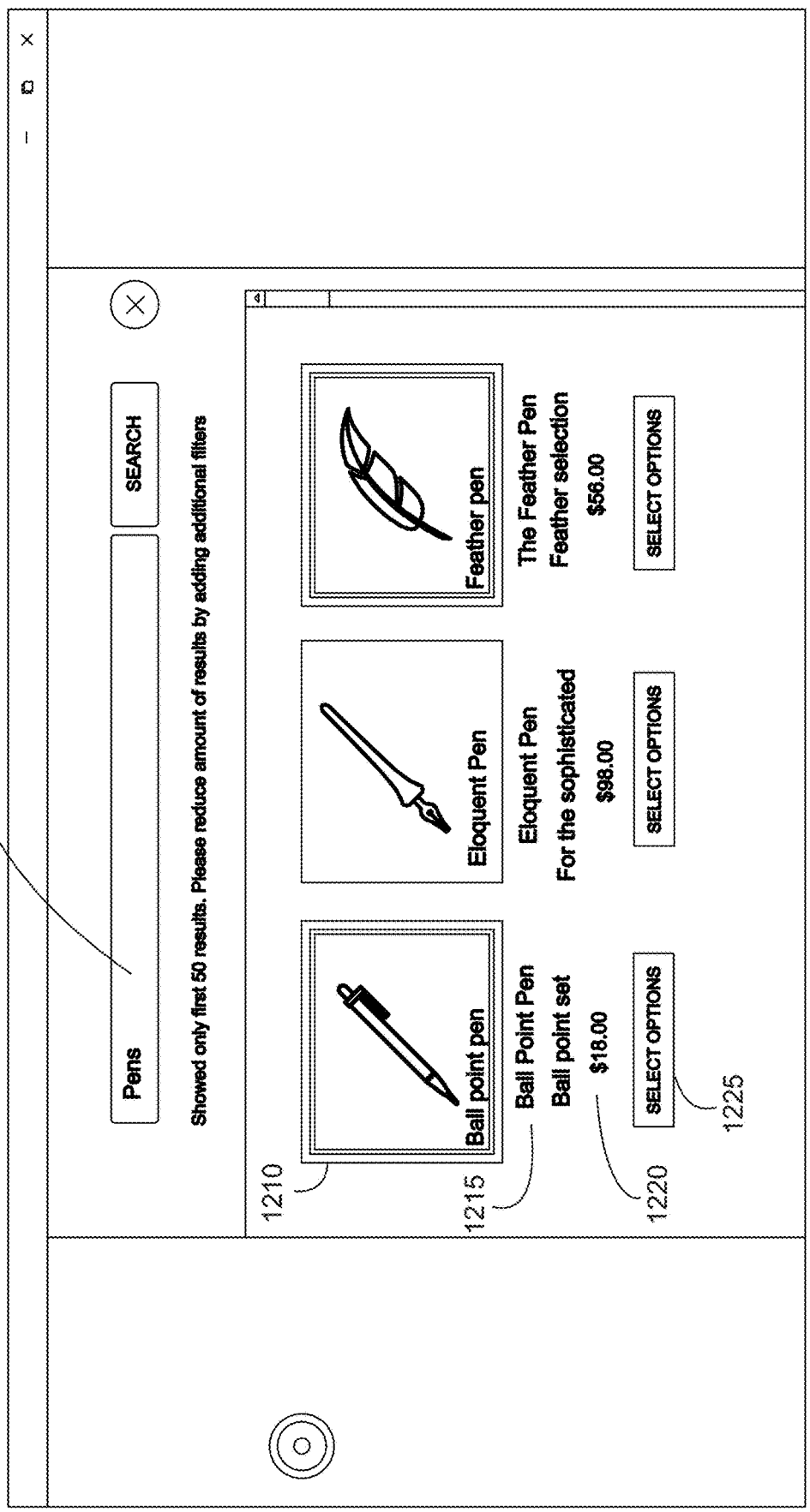
FIGS. 14 and 15 show illustrative user interfaces in which a common flow is implemented with a different website in the closed system accessibility environment.
Figure 15:
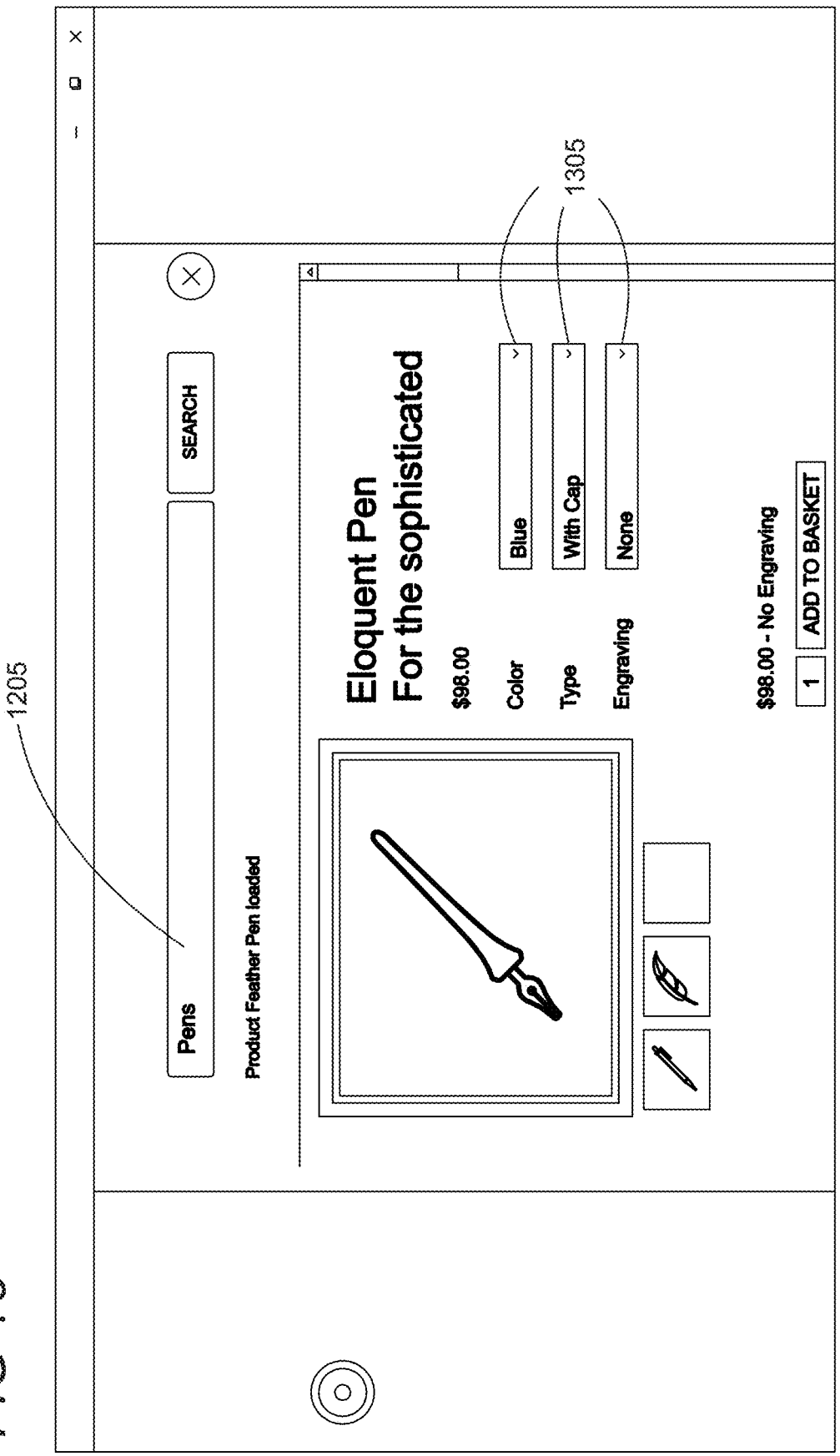

FIGS. 14 and 15 show illustrative user interfaces of the remote accessibility service's closed system accessibility environment 1020 with a different website. In this example, the user may be shopping an e-commerce store that sells office supplies, in which case the user performed a search for "Pens" in the search box 1205. As shown, FIGS. 14 and 15 have a presentation and provide a flow similar to that which was implemented for the jewelry e-commerce website depicted in FIGS. 12 and 13. That is, completely different websites with completely different product lines, categorizations, etc., are all harmonized using the closed system accessibility environment provided by the accessibility service. Thus, users that have a disability can efficiently, easily, and conveniently use their prior knowledge of the accessibility website's design features across multiple different websites, platforms, and industries.

Figure 16:
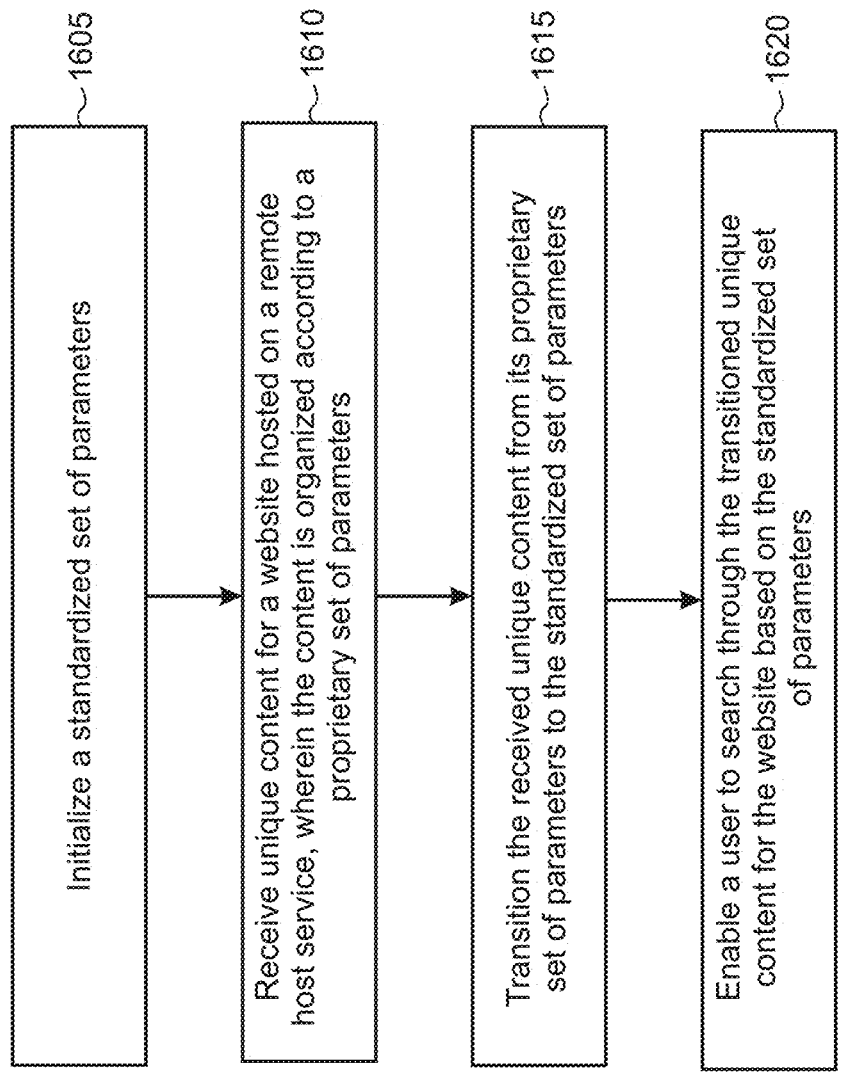
FIG. 16 shows an illustrative process implemented by a computing device, such as a remote accessibility service, for executing the present website plugin to enhance and standardize content accessibility.

FIG. 16 shows an illustrative process 1600 which may be implemented by one or more computing devices, such as a user device (e.g., laptop computer, smartphone device, tablet computer, desktop computer), or a remote service, such as a server. In step 1605, a remote accessibility service may initialize a standardized set of parameters based on which content is organized. In step 1610, the remote accessibility service receives unique content for a website hosted on a remote host service, wherein the content is organized according to a proprietary set of parameters. In step 1615, remote accessibility service transitions the received unique content from its proprietary set of parameters to the standardized set of parameters. In step 1620, the remote accessibility service enables a user to search through the transitioned unique content for the website using the standardized set of parameters.

Figure 17:
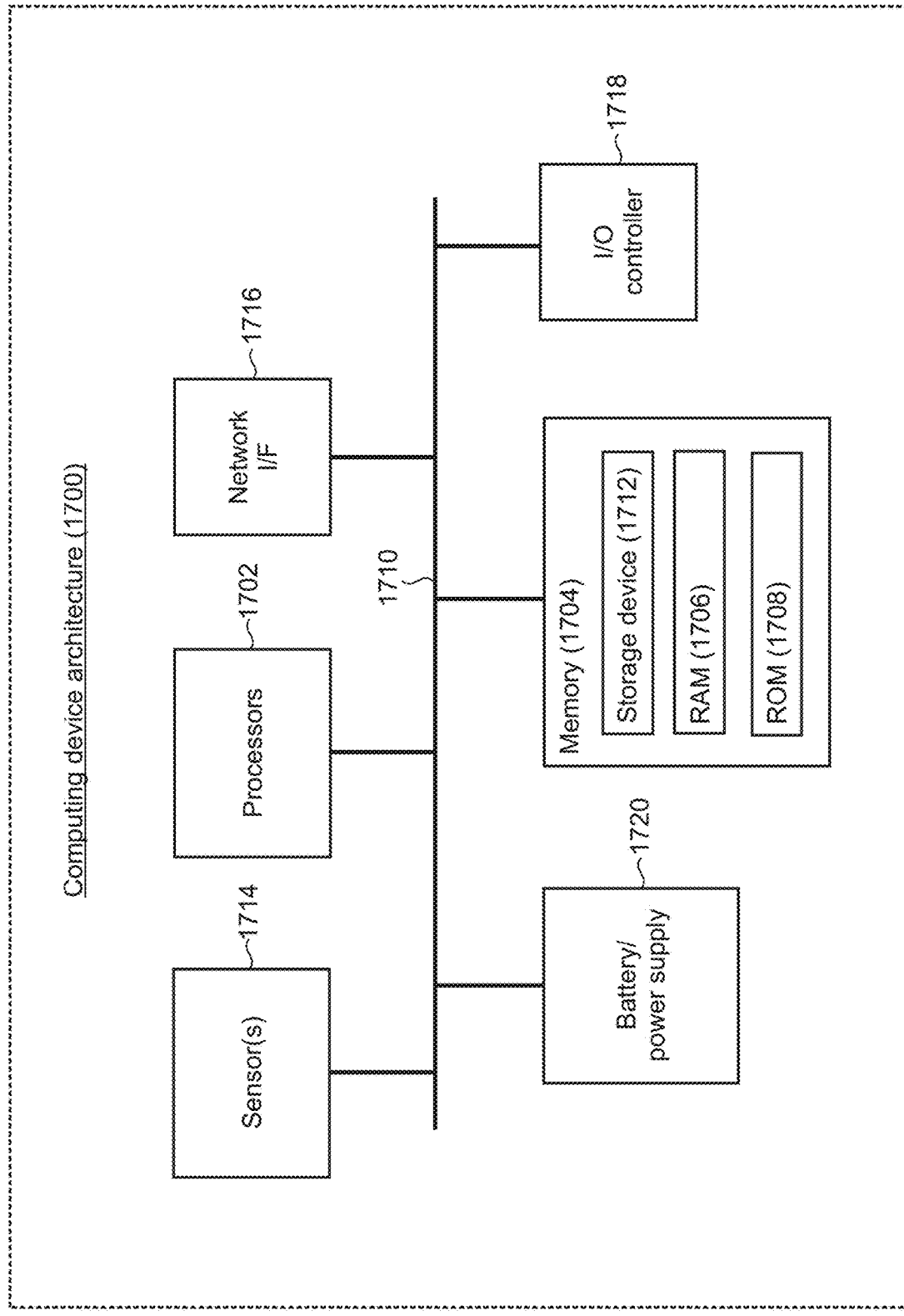
FIG. 17 shows a simplified block diagram of a computing device which may be used to implement the present website plugin to enhance and standardize content accessibility.

FIG. 17 shows an illustrative architecture 1700 for a device, such as a smartphone, tablet, laptop computer, or access device, capable of executing the various features described herein. The architecture 1700 illustrated in FIG. 17 includes one or more processors 1702 (e.g., central processing unit, dedicated AI chip, graphics processing unit, etc.), a system memory 1704, including RAM (random access memory) 1706, ROM (read only memory) 1708, and long-term storage devices 1712. The system bus 1710 operatively and functionally couples the components in the architecture 1700. A basic input/output system containing the basic routines that help to transfer information between elements within the architecture 1700, such as during startup, is typically stored in the ROM 1708. The architecture 1700 further includes a long-term storage device 1712 for storing software code or other computer-executed code that is utilized to implement applications, the file system, and the operating system. The storage device 1712 is connected to the processor 1702 through a storage controller (not shown) connected to the bus 1710. The storage device 1712 and its associated computer-readable storage media provide non-volatile storage for the architecture 1700. Although the description of computer-readable storage media contained herein refers to a long-term storage device, such as a hard disk or CD-ROM drive, it may be appreciated by those skilled in the art that computer-readable storage media can be any available storage media that can be accessed by the architecture 1700, including solid stage drives and flash memory.

By way of example, and not limitation, computer-readable storage media may include volatile and non-volatile, removable and non-removable media implemented in any method or technology for storage of information such as computer-readable instructions, data structures, program modules, or other data. For example, computer-readable media includes, but is not limited to, RAM, ROM, EPROM (erasable programmable read only memory), EEPROM (electrically erasable programmable read only memory), Flash memory or other solid state memory technology, CD-ROM, DVDs, HD-DVD (High Definition DVD), Blu-ray, or other optical storage, magnetic cassettes, magnetic tape, magnetic disk storage or other magnetic storage devices, or any other medium which can be used to store the desired information and which can be accessed by the architecture 1700.

According to various embodiments, the architecture 1700 may operate in a networked environment using logical connections to remote computers through a network. The architecture 1700 may connect to the network through a network interface unit 1716 connected to the bus 1710. It may be appreciated that the network interface unit 1716 also may be utilized to connect to other types of networks and remote computer systems. The architecture 1700 also may include an input/output controller 1718 for receiving and processing input from a number of other devices, including a keyboard, mouse, touchpad, touchscreen, control devices such as buttons and switches or electronic stylus (not shown in FIG. 17). Similarly, the input/output controller 1718 may provide output to a display screen, user interface, a printer, or other type of output device (also not shown in FIG. 17).

It may be appreciated that any software components described herein may, when loaded into the processor 1702 and executed, transform the processor 1702 and the overall architecture 1700 from a general-purpose computing system into a special-purpose computing system customized to facilitate the functionality presented herein. The processor 1702 may be constructed from any number of transistors or other discrete circuit elements, which may individually or collectively assume any number of states. More specifically, the processor 1702 may operate as a finite-state machine, in response to executable instructions contained within the software modules disclosed herein. These computer-executable instructions may transform the processor 1702 by specifying how the processor 1702 transitions between states, thereby transforming the transistors or other discrete hardware elements constituting the processor 1702.

Encoding the software modules presented herein also may transform the physical structure of the computer-readable storage media presented herein. The specific transformation of physical structure may depend on various factors in different implementations of this description. Examples of such factors may include, but are not limited to, the technology used to implement the computer-readable storage media, whether the computer-readable storage media is characterized as primary or secondary storage, and the like. For example, if the computer-readable storage media is implemented as semiconductor-based memory, the software disclosed herein may be encoded on the computer-readable storage media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable storage media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media to change the optical characteristics of those locations. Other transformations of physical media are possible without departing from the scope and spirit of the present description, with the foregoing examples provided only to facilitate this discussion.

In light of the above, it may be appreciated that many types of physical transformations take place in the architecture 1700 in order to store and execute the software components presented herein. It also may be appreciated that the architecture 1700 may include other types of computing devices, including wearable devices, handheld computers, embedded computer systems, smartphones, PDAs, and other types of computing devices known to those skilled in the art. It is also contemplated that the architecture 1700 may not include all of the components shown in FIG. 17, may include other components that are not explicitly shown in FIG. 17, or may utilize an architecture completely different from that shown in FIG. 17.

Figure 18:
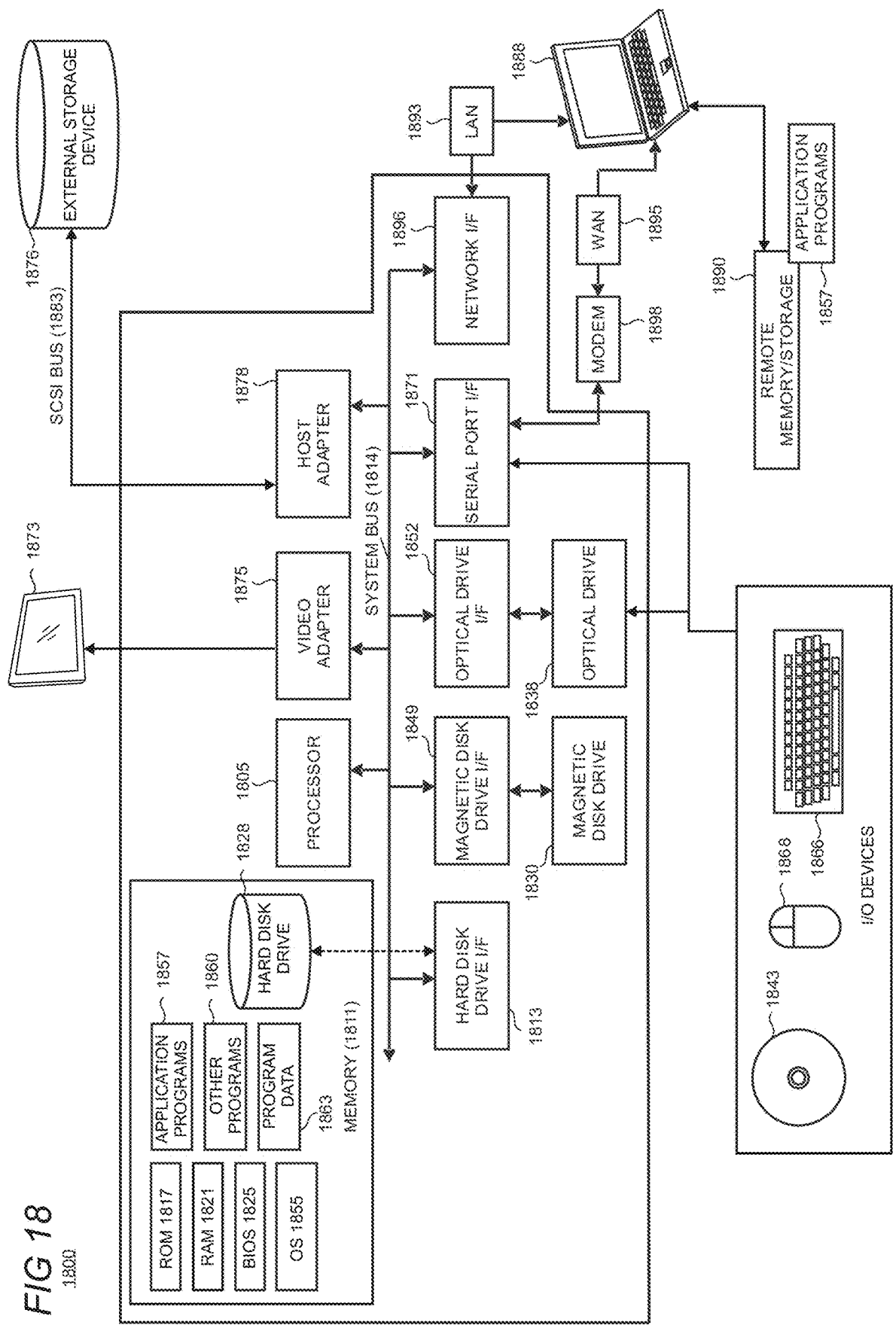
FIG. 18 shows a simplified block diagram of a computing device which may be used to implement the preset website plugin to enhance and standardize content accessibility.

FIG. 18 is a simplified block diagram of an illustrative computer system 1800 such as a remote server, smartphone, tablet computer, laptop computer, or personal computer (PC) which the present disclosure may be implemented. Computer system 1800 includes a processor 1805, a system memory 1811, and a system bus 1814 that couples various system components including the system memory 1811 to the processor 1805. The system bus 1814 may be any of several types of bus structures including a memory bus or memory controller, a peripheral bus, or a local bus using any of a variety of bus architectures. The system memory 1811 includes read only memory (ROM) 1817 and random access memory (RAM) 1821. A basic input/output system (BIOS) 1825, containing the basic routines that help to transfer information between elements within the computer system 1800, such as during startup, is stored in ROM 1817. The computer system 1800 may further include a hard disk drive 1828 for reading from and writing to an internally disposed hard disk, a magnetic disk drive 1830 for reading from or writing to a removable magnetic disk (e.g., a floppy disk), and an optical disk drive 1838 for reading from or writing to a removable optical disk 1843 such as a CD (compact disc), DVD (digital versatile disc), or other optical media. The hard disk drive 1828, magnetic disk drive 1830, and optical disk drive 1838 are connected to the system bus 1814 by a hard disk drive interface 1846, a magnetic disk drive interface 1849, and an optical drive interface 1852, respectively. The drives and their associated computer-readable storage media provide non-volatile storage of computer-readable instructions, data structures, program modules, and other data for the computer system 1800. Although this illustrative example includes a hard disk, a removable magnetic disk 1833, and a removable optical disk 1843, other types of computer-readable storage media which can store data that is accessible by a computer such as magnetic cassettes, Flash memory cards, digital video disks, data cartridges, random access memories (RAMs), read only memories (ROMs), and the like may also be used in some applications of the present disclosure. In addition, as used herein, the term computer-readable storage media includes one or more instances of a media type (e.g., one or more magnetic disks, one or more CDs, etc.). For purposes of this specification and the claims, the phrase "computer-readable storage media" and variations thereof, are intended to cover non-transitory embodiments, and does not include waves, signals, and/or other transitory and/or intangible communication media.

A number of program modules may be stored on the hard disk, magnetic disk, optical disk 1843, ROM 1817, or RAM 1821, including an operating system 1855, one or more application programs 1857, other program modules 1860, and program data 1863. A user may enter commands and information into the computer system 1800 through input devices such as a keyboard 1866, pointing device (e.g., mouse) 1868, or touch-screen display 1873. Other input devices may include a microphone, joystick, game pad, satellite dish, scanner, trackball, touchpad, touch-sensitive device, voice-command module or device, user motion or user gesture capture device, or the like. These and other input devices are often connected to the processor 1805 through a serial port interface 1871 that is coupled to the system bus 1814, but may be connected by other interfaces, such as a parallel port, game port, or universal serial bus (USB). A monitor 1873 or other type of display device is also connected to the system bus 1814 via an interface, such as a video adapter 1875. In addition to the monitor 1873, personal computers typically include other peripheral output devices (not shown), such as speakers and printers. The illustrative example shown in FIG. 18 also includes a host adapter 1878, a Small Computer System Interface (SCSI) bus 1883, and an external storage device 1876 connected to the SCSI bus 1883.

The computer system 1800 is operable in a networked environment using logical connections to one or more remote computers, such as a remote computer 1888. The remote computer 1888 may be selected as another personal computer, a server, a router, a network PC, a peer device, or other common network node, and typically includes many or all of the elements described above relative to the computer system 1800, although only a single representative remote memory/storage device 1890 is shown in FIG. 18. The logical connections depicted in FIG. 18 include a local area network (LAN) 1893 and a wide area network (WAN) 1895. Such networking environments are often deployed, for example, in offices, enterprise-wide computer networks, intranets, and the Internet.

When used in a LAN networking environment, the computer system 1800 is connected to the local area network 1893 through a network interface or adapter 1896. When used in a WAN networking environment, the computer system 1800 typically includes a broadband modem 1898, network gateway, or other means for establishing communications over the wide area network 1895, such as the Internet. The broadband modem 1898, which may be internal or external, is connected to the system bus 1814 via a serial port interface 1871. In a networked environment, program modules related to the computer system 1800, or portions thereof, may be stored in the remote memory storage device 1890. It is noted that the network connections shown in FIG. 18 are illustrative and other means of establishing a communications link between the computers may be used depending on the specific requirements of an application of the present disclosure.

Various implementations are described herein. For example, disclosed is a remote accessibility service configured to enhance and standardize content accessibility on websites, comprising: a network interface to communicate with remote host services on which the websites are hosted; one or more processors; and one or more hardware-based memory devices having instructions which, when executed by the one or more processors, cause the remote service to: initialize a standardized set of parameters; receive unique content for a website hosted on a remote host service, wherein the content is organized according a proprietary set of parameters; transition the received unique content from its proprietary set of parameters to the standardized set of parameters on the remote accessibility service; and enable a user to search through the transitioned unique content for the website based on the standardized set of parameters.

In another example, the remote accessibility service exposes the transitioned unique content responsive to receiving a request from the user's computing device to access the unique content associated with the website. As another example, the user's request includes a request to access a portion of the website that provides an accessibility version for disabled individuals. As another example, the executed instructions further cause the remote accessibility service to: receive a second set of unique content for a second website, in which the second website's unique content is organized according to a proprietary set of standards that are distinct from the website's unique content; and transition the received second set of unique content from its proprietary set of parameters to the standardized set of parameters on the remote accessibility service, wherein each website's originally proprietary set of parameters are organized according to the standardized set of parameters on the remote accessibility service. Another example further includes multiple sets of standardized parameters which change based on a type of website. As another example, standardized set of parameters exist for e-commerce websites, governmental websites, news websites, and websites dedicated to providing services. As another example, the executed instructions further cause the remote accessibility service to receive a request from the website's remote host service for the remote accessibility service to parse the website's unique content, and based on which receive the unique content. As another example, the executed instructions further cause the remote service to transmit a plugin which executes JavaScript code that retrieves the website's contents. In another example, the executed instructions further cause the remote service to transmit a plugin to the website's host platform to retrieve the website's contents.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A remote accessibility service configured to enhance and standardize content accessibility on websites, comprising:
   a network interface to communicate with remote host services on which the websites are hosted:
   one or more processors; and
   one or more hardware-based memory devices having instructions which, when executed by the one or more processors, cause the remote service to:
      initialize a plurality of sets of standardized parameters, each set of standardized parameters corresponding to a different one of a plurality of types of websites;
      receive unique content for a website hosted on a remote host service, wherein the content is organized according to a proprietary set of parameters;
      detect a type of the website;
      generate a reconfigured website by transitioning the received unique content from its proprietary set of parameters to the standardized set of parameters on the remote accessibility service that correspond to the type of the website;
      store the reconfigured website;
      responsive to user input at the website, redirect a user to the reconfigured website stored on the remote accessibility service, in which the remote accessibility service provides the reconfigured website within its closed system accessibility environment; and
      enable a user to search through the reconfigured website within the closed system accessibility environment using a search feature of the reconfigured website that is based on the standardized set of parameters that correspond to the type of the website.

2. The remote accessibility service of claim 1, wherein the user's input at the website includes a request to access a portion of the website that provides an accessibility version for disabled individuals.

3. The remote accessibility service of claim 1, wherein the executed instructions further cause the remote accessibility service to:
   receive a second set of unique content for a second website, in which the second website's unique content is organized according to a proprietary set of standards that are distinct from the website's unique content; and
   transition the received second set of unique content from its proprietary set of parameters to the standardized set of parameters on the remote accessibility service, wherein each website's originally proprietary set of parameters are organized according to the standardized set of parameters on the remote accessibility service.

4. The remote accessibility service of claim 1, wherein standardized set of parameters exist for e-commerce websites, governmental websites, news websites, and websites dedicated to providing services.

5. The remote accessibility service of claim 1, wherein the executed instructions further cause the remote accessibility service to receive a request from the website's remote host service for the remote accessibility service to parse the website's unique content, and based on which receive the unique content.

6. The remote accessibility service of claim 5, wherein the executed instructions further cause the remote service to transmit a plugin which executes JavaScript code that retrieves the website's contents.

7. The remote accessibility service of claim 5, wherein the executed instructions further cause the remote service to transmit a plugin to the website's host platform to retrieve the website's contents.

* * * * *